United States Patent [19]
Wentz et al.

[11] 3,802,548
[45] Apr. 9, 1974

[54] INDUCTION LOADING TARGET DISPLAY

[75] Inventors: Edward A. Wentz, Gaithersburg; John H. Swam, Manchester, both of Md.

[73] Assignee: American Chain & Cable Company Inc., Bridgeport, Conn.

[22] Filed: Sept. 25, 1972

[21] Appl. No.: 292,174

[52] U.S. Cl. .................................................. 198/40
[51] Int. Cl. ............................................ B65g 43/00
[58] Field of Search ......... 198/40; 40/130 L, 130 K; 340/378

[56] References Cited
UNITED STATES PATENTS
3,140,771  7/1964  Harrison et al. ................... 198/76 X
2,507,909  5/1950  Kaysen ............................... 40/130 K
1,698,223  1/1929  Craig ................................. 40/130 L Primary Examiner—Evon C. Blunk
Assistant Examiner—Joseph E. Valenza
Attorney, Agent, or Firm—Barnes, Kissele, Raisch & Choate

[57] ABSTRACT

A moving induction conveyor is targeted by a visual display for placement of articles thereon whereby the articles are deposited onto a receiving conveyor at proper locations. The visual display is synchronized with operation of the receiving conveyor through an optically controlled switching system to form a moving target.

10 Claims, 8 Drawing Figures

INDUCTION LOADING TARGET DISPLAY

This invention relates in general to conveyor systems in which articles loaded onto an induction conveyor are transferred to a receiving conveyor and more particularly to the targeting of the induction conveyor for proper placement of the articles thereon.

In conveyor systems of the aforementioned type marking of loading zones on the induction conveyor belt require precise and constant synchronization between the induction conveyor belt and the receiving conveyor in order to obtain deposit of articles onto the receiving conveyor at the proper locations. The synchronizing controls must compensate for changes in ambient conditions and conveyor belt slippage, resulting in highly sophisticated and costly control systems requiring excessive maintenance by skilled technicians. In other less complex targeting systems, an audible or visual alarm signal is produced each time an article is to be loaded at a fixed location. No loading zones are defined, however, and the operator must be ready with an article for loading at the instant each alarm signal is produced in the latter type of system.

It is therefore an important object of the present invention to provide a targeting system that will avoid the necessity for the precise and constant corrective synchronization aforementioned between movement of the induction conveyor belt subject to stoppage and distortion and movement of the receiving conveyor to which articles are transferred and the control system complexities incident thereto. A further object is to provide a targeting system that will denote a target zone capable of being more easily loaded by the operator.

In accordance with the present invention, a moving target zone is defined by illumination of lamps arranged in an elongated display bar extending from a loading platform and alongside of the induction conveyor onto which the articles are manually transferred from the platform by an operator. By progressive and sequential illumination and extinction of lamps, the target zone defined by the display bar moves in the direction of travel of the induction conveyor in synchronization with movement of the receiving conveyor. Synchronization is obtained by controlling the display lamp control circuit through a rotary switching device driven from the drive for the receiving conveyor. In one embodiment of the invention, the rotary switching device features a masked internally reflective prism through which solid state switches are light activated to operate the display lamps with reduced voltage for prolonged trouble-free service.

Figure 1:
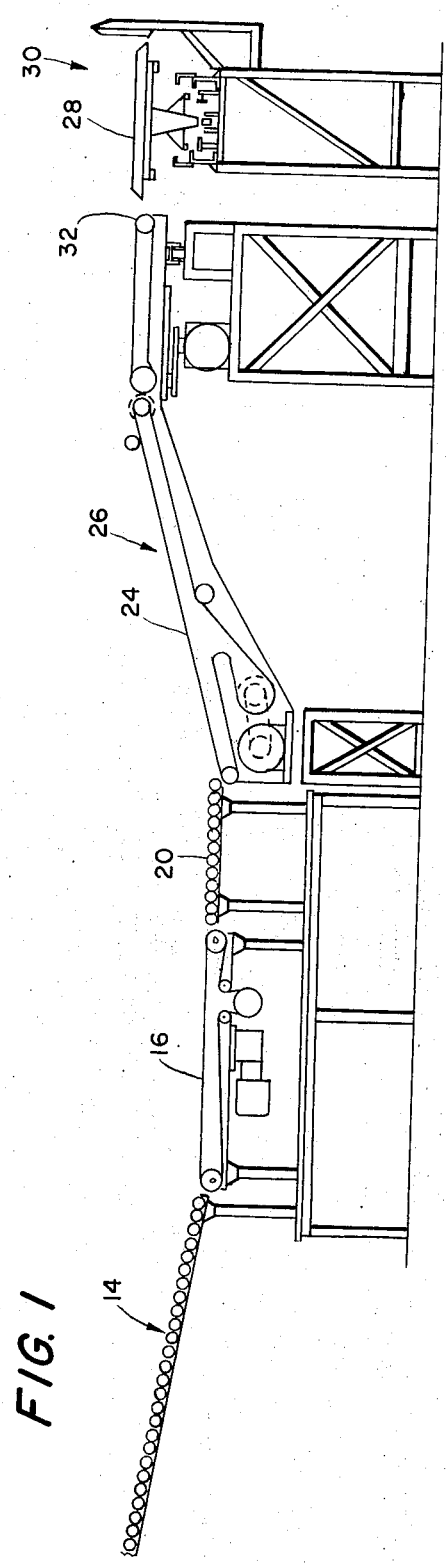
FIG. 1 is a side elevational view of a sorter induction conveyor system with which the present invention is associated.

Referring now to the drawings in detail, FIGS. 1 and 3 illustrate a sorter induction conveyor arrangement generally denoted by reference numeral 10 which is similar to the conveyor arrangement disclosed in copending application, Ser. No. 69,409, filed Sept. 3, 1970, and assigned to the assignee of the present invention and application. In this conveyor arrangement articles or packages 12 are delivered by a gravity feed conveyor 14 to an operator controlled input belt conveyor 16 on which the packages are coded by an operator 18 and then transferred to a roller type loading platform 20. The coded packages accumulated on the platform 20 are manually transferred by another operator 22 to the continuously moving conveyor belt 24 of an oscillating type of induction conveyor 26 from which the packages are transferred to sorting trays 28 carried by a main receiving conveyor 30. By loading each package at the proper location on the induction conveyor belt 24 at any given instant of time, transfer will occur at the delivery end 32 of the induction conveyor when it is centrally aligned with a sorting tray 28 during the oscillatory stroke of the induction conveyor in the direction of travel of the receiving conveyor 30. Linear movement of the conveyor belt 24 as well as oscillatory movement of the conveyor frame is therefore nominally synchronized with movement of the receiving conveyor by interrelating the drive of the two conveyors at a fixed speed ratio.

Figures 3A, 3B, 3C:
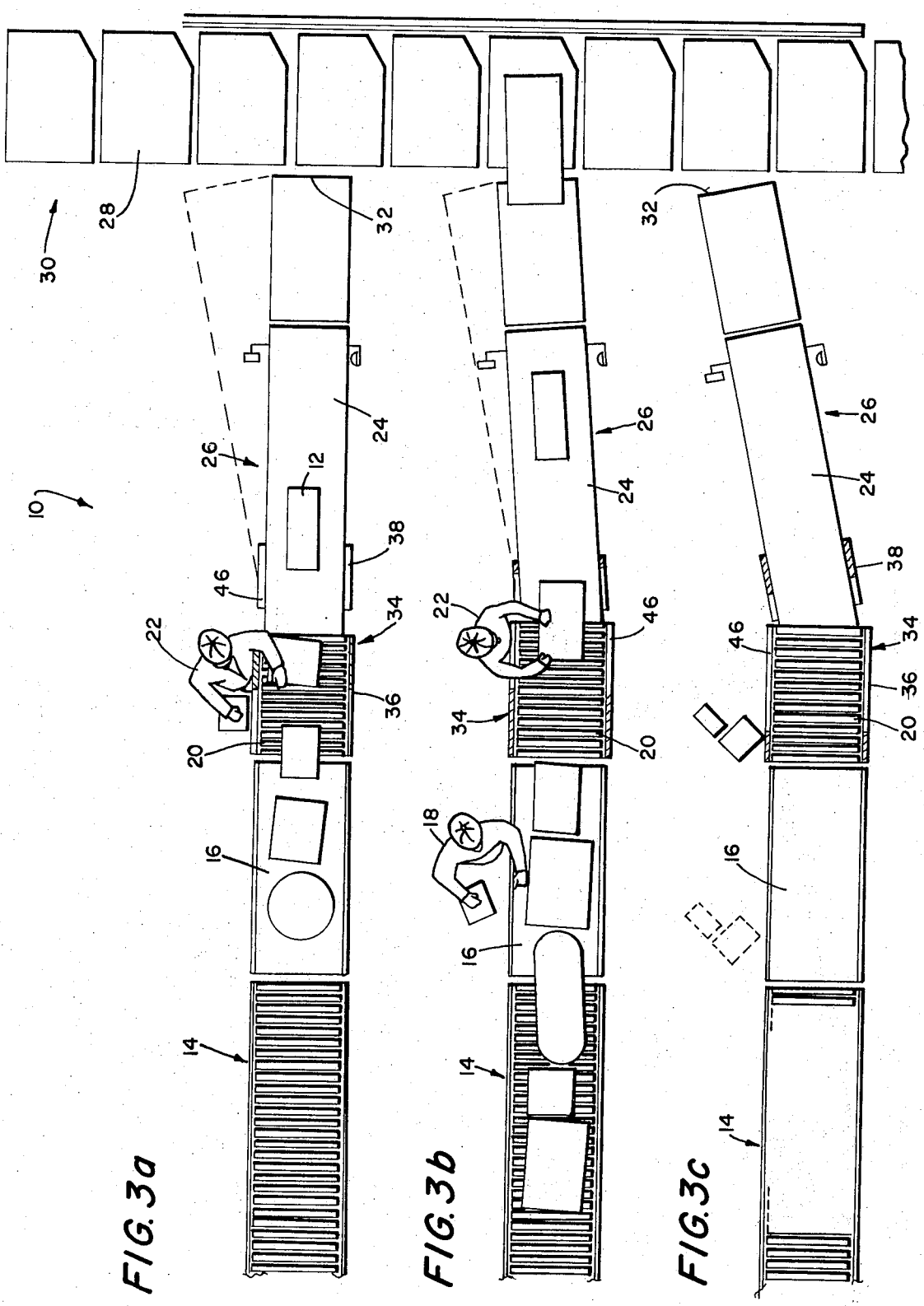
FIG. 3a, 3b and 3c are top plan views of the sorter induction system and the loading target display in different operational phases.
Figure 6:
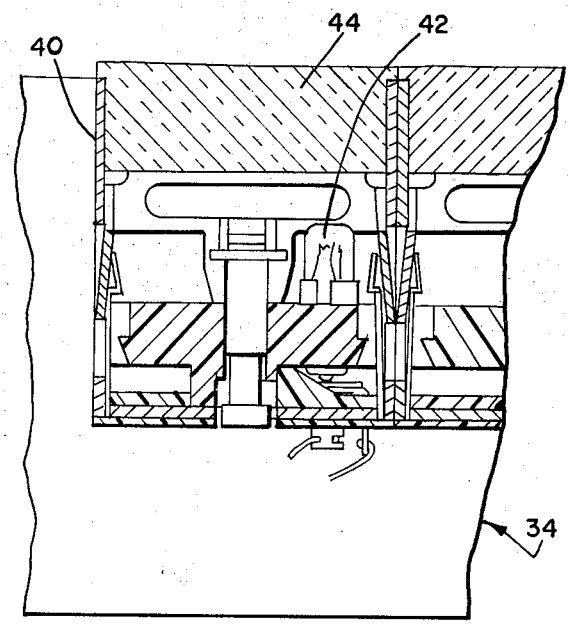
FIG. 6 is an enlarged partial sectional view through one of the lamp bars associated with the loading target display.

As shown in FIGS. 3a, 3b and 3c, a visual loading target display generally denoted by reference number 34 is provided on opposite longitudinal sides of the loading platform 20 and the induction conveyor 26. Each display 34 includes a stationary light bar section 36 alongside of the loading platform and a section 38 mounted on the frame of the oscillating induction conveyor 26 for movement therewith. The light bar sections include elongated housings 40 as more clearly seen in FIG. 6 mounting a plurality of lamps 42 from which illumination is emitted through removable light transmissive covers 44 that may be amber colored for example, to provide maximum visual contrast between the illuminated and extinguished states of the lamps.

The lamps 42 in the light bar section 36 and 38 are controllably illuminated and extinguished to form a nonilluminated gap 46 between illuminated portions thereby defining a target zone across the roller platform 20 and the induction conveyor belt 24 adjacent its input end. By progressive and sequential illumination and extinction of lamps in the bar sections 36 and 38, the target zone gap 46 moves in the direction of travel of conveyor belt 24 at a speed synchronized with the movement of the sorter conveyor 30. The operator may thereby easily move a package along the loading platform 20 onto the conveyor belt 24 within the target zone as the target zone moves from one end of the loading platform along bar section 36 as shown in FIG. 3a to the bar section 38 along the induction conveyor adjacent the input end. Movement of the target zone is synchronized directly with the movement of the sorter conveyor 30 independently of induction conveyor movement and is therefore not affected by conveyor belt slippage, distortion and other variable factors.

Figure 4:
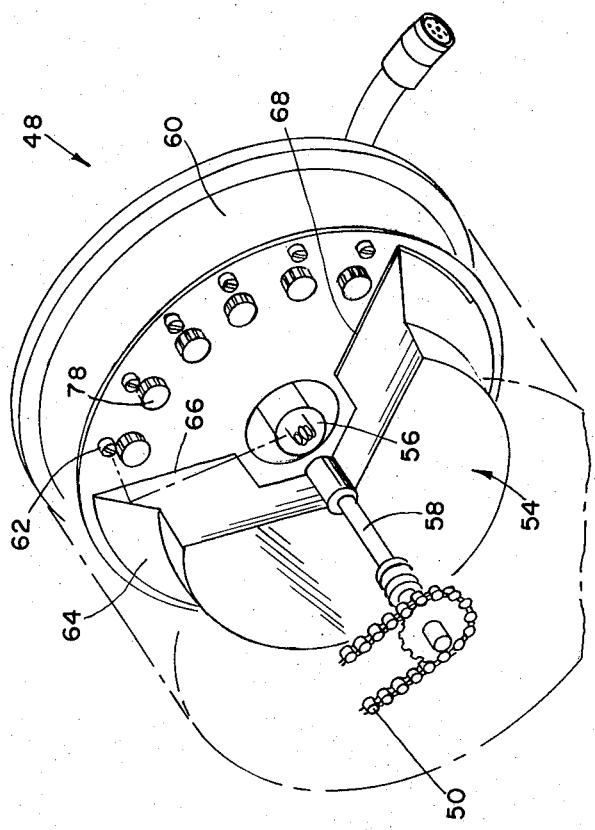
FIG. 4 is a partial cut away perspective view of the rotary switching device.
Figure 2:
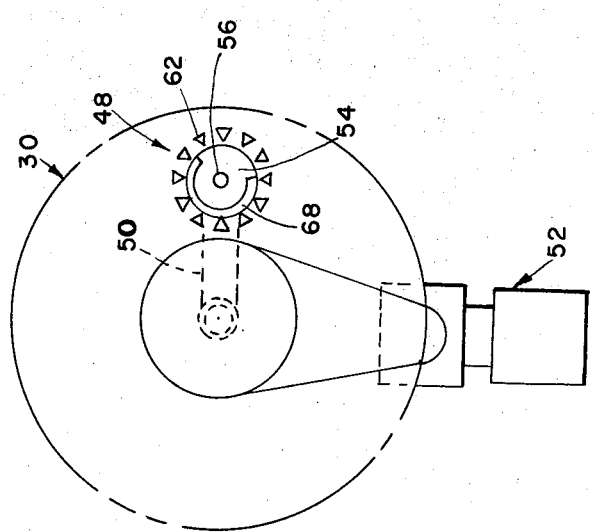
FIG. 2 is a simplified top plan view showing the rotary switching device in association with the sorter conveyor drive.

Synchronized operation of the visual loading target display 34 is effected by a rotary switching device 48 that is driven through a power take-off sprocket drive 50 from the drive mechanism 52 for the sorter conveyor 30 as shown in FIG. 2. The switching device 48 includes an internally reflective prism 54 as seen in FIG. 4 that is rotated by the sprocket drive 50 to reflect illumination from a stationary lamp 56 centrally aligned with the drive shaft 58 through which the prism is connected to the sprocket drive. The lamp 56 is exposed through a central opening on the face of a stationary housing 60 on which a plurality of circumferentially spaced photo-resistive elements 62 are mounted. Light reflected from surface 64 of the prism emerges from face 66 and impinges on the photo-resistive elements 62 closely spaced therefrom in an axial direction along shaft 58. A portion of the face 66 is masked by an arcuate light absorbing mask 68 as shown in FIGS. 2 and 4 to block light from a group of elements 62. Accordingly, there will be a shift in the group of elements 62 activated by light from lamp 56 in synchronized relation to movement of the sorter conveyor.

Figure 5:
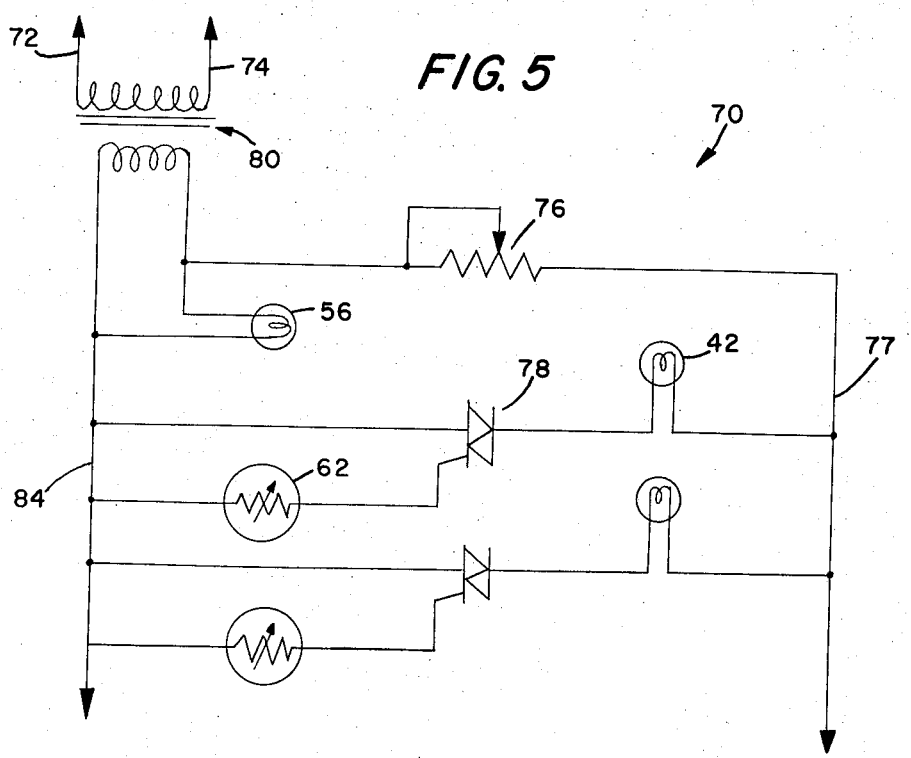
FIG. 5 is an electrical circuit diagram of the control circuit for the loading target display lamps.

FIG. 5 illustrates a typical control circuit 70 through which the photo-resistive elements 62 control synchronized operation of the lamps 42 in the loading target display 34. A source of AC voltage to power lines 72 and 74 is applied to the primary of transformer 80 having a lower voltage output secondary connected to lines 82 and 84. Each of the lamps 42 is also connected across the lines 82 and 84 in series with a brilliance controlling rheostat 76 through line 77 and one of a plurality of solid state switches such as triac 78 that is switches on through an associated one of the photo-resistive elements 62. Each of the elements 62 forms a low voltage trigger for its switch 78. Both the lamps 42 and the triacs 78 operating with reduced voltage will be relatively immune to normal ambient variations and require a minimal amount of maintenance.

What is claimed is:

1. In combination with a receiving conveyor and a drivingly interrelated feed-in conveyor from which articles are adapted to be conveyed along a path of travel toward spaced locations on the receiving conveyor, means for targeting locations on the feed-in conveyor at which articles must be placed to insure transfer to the spaced locations on the receiving conveyor, comprising a plurality of visual indicators positioned along the feed-in conveyor to define a target zone generally parallel to the path of travel of the articles, control means connected to said indicators for sequentially activating and deactivating the same to effect movement of said target zone along the feed-in conveyor, and operating means connected to the control means and driven at a fixed speed ratio to the receiving conveyor for synchronizing said movement of the target zone with movement of the receiving conveyor.

2. The combination of claim 1 including a loading zone located upstream of said feed-in conveyor along said path of travel, said indicators extending from the feed-in conveyor into the loading zone.

3. The combination of claim 2 wherein said indicators comprise closely spaced lamps that are energized and extinguished in sequence to define the target zone.

4. The combination of claim 3 wherein the control means comprises a plurality of switch devices for respectively activating the indicators.

5. The combination of claim 4 wherein said operating means comprises a plurality of sensing means for operating the switch devices, a source of radiation for triggering said sensing means to operate the switch devices and means driven by the receiving conveyor for sequentially transmitting radiation to the sensing means from said source of radiation.

6. The combination of claim 1 wherein said operating means comprises a plurality of sensing means for operating the switch devices, a source of radiation for triggering said sensing means to operate the control means and means driven by the receiving conveyor for sequentially transmitting radiation to the sensing means from said source of radiation.

7. The combination of claim 1 wherein said indicators comprise closely spaced lamps that are energized and extinguished in sequence to define the target zone.

8. The combination of claim 7 wherein the control means comprises a plurality of switch devices for respectively activating the indicators.

9. The combination of claim 1 wherein said feed-in conveyor includes an endless belt subject to slippage and distortion while conveying the articles.

10. In combination with a receiving conveyor and a belt conveyor driven at a fixed speed ratio to the receiving conveyor, means for targeting locations on the belt conveyor at which articles are adapted to be placed to insure transfer thereof to predetermined spaced locations on the receiving conveyor, comprising visual indicator means mounted adjacent the belt conveyor for defining a target zone on the belt conveyor, control means operatively connected to the indicator means for effecting movement of the target zone along the belt conveyor, and operating means driven by the receiving conveyor independently of the belt conveyor for synchronizing said movement of the target zone with movement of the receiving conveyor.

* * * * *